US005221099A

United States Patent [19]

Jänsch

[11] Patent Number: 5,221,099

[45] Date of Patent: Jun. 22, 1993

[54] DEVICE FOR CONDUCTING FORCES INTO MOVABLE OBJECTS

[75] Inventor: Manfred Jänsch, Garbsen, Fed. Rep. of Germany

[73] Assignee: Weatherford Products & Equipment GmbH, Langenhagen, Fed. Rep. of Germany

[21] Appl. No.: 809,486

[22] PCT Filed: May 8, 1991

[86] PCT No.: PCT/DE91/00377

§ 371 Date: Jan. 10, 1992

§ 102(e) Date: Jan. 10, 1992

[87] PCT Pub. No.: WO91/18181

PCT Pub. Date: Nov. 28, 1991

[30] Foreign Application Priority Data

May 11, 1990 [DE] Fed. Rep. of Germany ....... 4015121
Mar. 18, 1991 [DE] Fed. Rep. of Germany ....... 4108760

[51] Int. Cl.[5] .......... B23B 31/10

[52] U.S. Cl. .......... 279/151; 81/185.1; 269/275; 294/86.32; 294/99.1; 279/46.6

[58] Field of Search .......... 279/20.1, 43.6, 46.6, 279/151; 269/266, 275; 81/185.1, 186; 294/86.32, 99.1

[56] References Cited

U.S. PATENT DOCUMENTS

| | | | |
|---|---|---|---|
| 1,650,101 | 11/1927 | Taylor . | |
| 2,765,000 | 10/1956 | Bond | 138/65 |
| 2,793,136 | 5/1957 | Root | 117/33 |
| 3,368,252 | 2/1968 | Meek | 24/263 |
| 3,799,010 | 3/1974 | Guier | 81/57.17 |

FOREIGN PATENT DOCUMENTS

| | | |
|---|---|---|
| 705856 | 4/1941 | Fed. Rep. of Germany . |
| 806426 | 2/1952 | Fed. Rep. of Germany . |
| 489305 | 8/1938 | United Kingdom . |
| 2011028 | 7/1979 | United Kingdom . |

*Primary Examiner*—Steven C. Bishop
*Attorney, Agent, or Firm*—Peter K. Kontler

[57] ABSTRACT

The jaws of a clamp are provided with elastomeric linings, and gripping elements of high hardness in the form of pins or particles are embedded in the linings. The gripping elements have tips which are directed away from the respective jaws.

18 Claims, 4 Drawing Sheets

Figure 4:
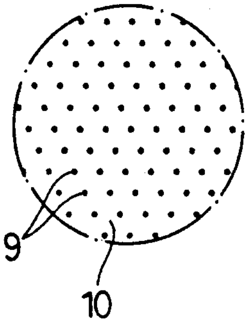

Fig. 1
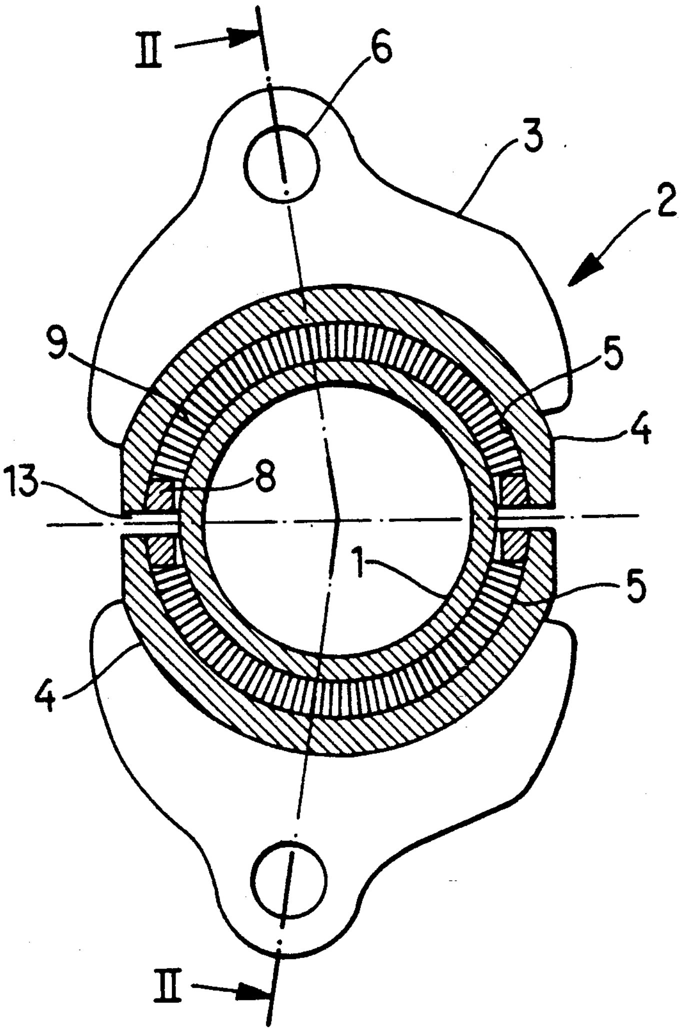
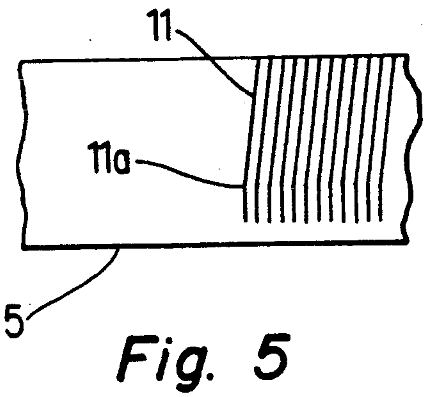
Fig. 5

DEVICE FOR CONDUCTING FORCES INTO MOVABLE OBJECTS

The invention relates to a device for conducting translational forces and/or torques into movable objects by means of clamping jaws which engage the objects.

When using devices of the above type, considerable clamping forces must be generated in order to lift or even shift heavy parts, for instance. Furthermore, large torques are required, by way of example, to screw pipes to or disengage pipes from one another. To achieve reliable transmission of the clamping forces to the movable objects, the clamping jaws are frequently equipped with blades. The blades or other elements which significantly increase the local contact pressure often damage the surfaces of the rigid objects to be moved or cause undesired indentations so that the damaged object surfaces undergo increased corrosion. For this reason, stainless steel is increasingly employed for borehole pipes in oil field technology. Due to cost considerations, long life is therefore of importance. Another drawback is that, after the clamping jaw blades have been pressed into the material and the bearing force has been released, the clamping jaw blades can frequently be disengaged from the gripped surfaces of the objects to be moved only with difficulty. This applies particularly to the disengagement of clamping blades from a pipe following an unscrewing procedure. Thus, subsequent to the complete release of a pipe from a connecting piece, it is very difficult to remove the clamping jaws from the unscrewed workpiece by reversing the direction of rotation because a countermoment no longer exists.

It is an object of the invention to design a device of the type referred to at the outset so that it is possible for the clamping jaws to grip the surfaces of the objects to be engaged and moved without damage. The solution according to the invention is characterized in that the clamping jaws are equipped with linings of elastomeric material serving as carrier material for a multiplicity of hard, small elements having tips which are directed towards the bearing surfaces of the objects to be clamped.

The invention makes it possible, largely independently of the material used, to transfer large translational forces directed perpendicular to the clamping forces, or large torques, to rigid objects to be moved without damaging their surfaces and thereby causing these to undergo increased corrosion. Even plastic objects can be engaged with drawbacks. This advantage is achieved by a combined frictional and configurational locking over a wide area. The elasticity of the carrier material provides for full surface-to-surface contact between the lining and the surfaces to be engaged even when these deviate from a completely flat or cylindrical shape and, for instance, have regions of greater or lesser unevennesses or curvatures.

The use of pin-shaped elements which are embedded in the carrier material is particularly advantageous. The ends of the pins at the gripping side essentially reach the surface of the lining lying against the objects to be moved while the ends of the pins at the side of the clamping jaws preferably terminate at a distance from the bearing surface of the elastomeric linings against the clamping jaws. The elastomeric material between the clamping jaws and the pin ends at the side of the clamping jaws can compensate for unevennesses of the parts to be clamped because elastomeric material can flow sideways at high pressure.

Other hard particles of granular form can be used instead of the pins. Crystalline grains of diamond, glass, corundum, quartz, ceramic and the like having the same size or different sizes are suitable for this purpose.

Additional features advantageous for the design of the invention are set forth in the subclaims.

Exemplary embodiments of the invention for transferring forces to objects to be moved are illustrated in the drawing purely schematically and described below.

Figure 2:
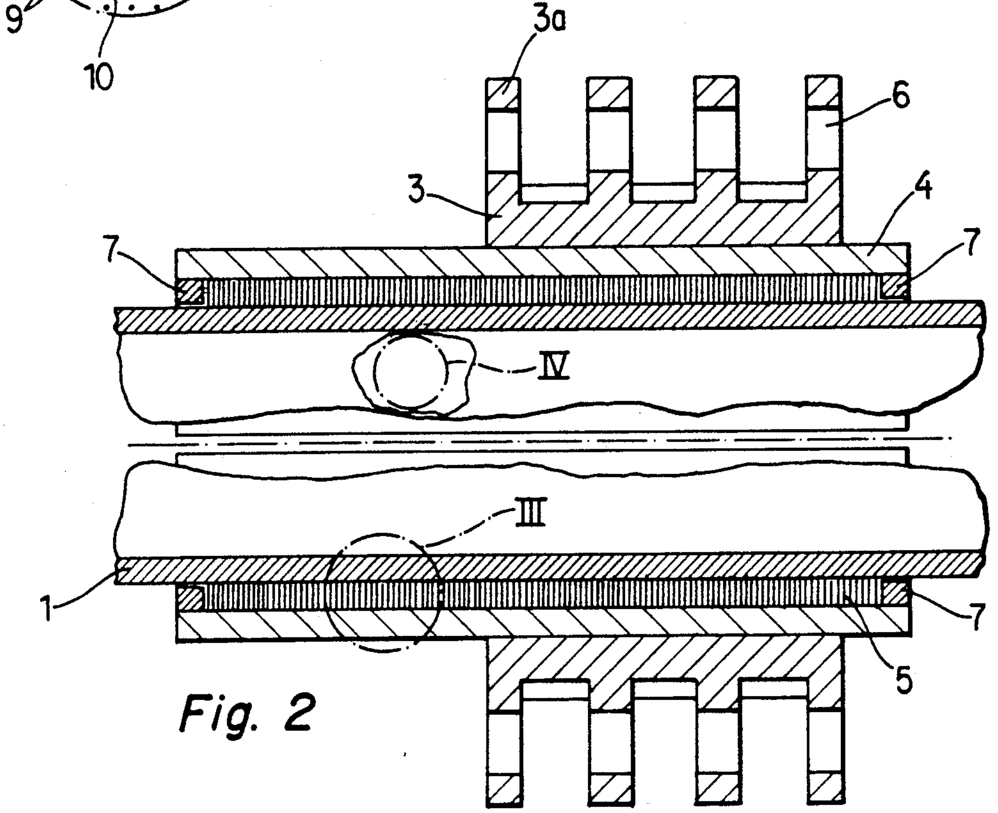
Figure 3:
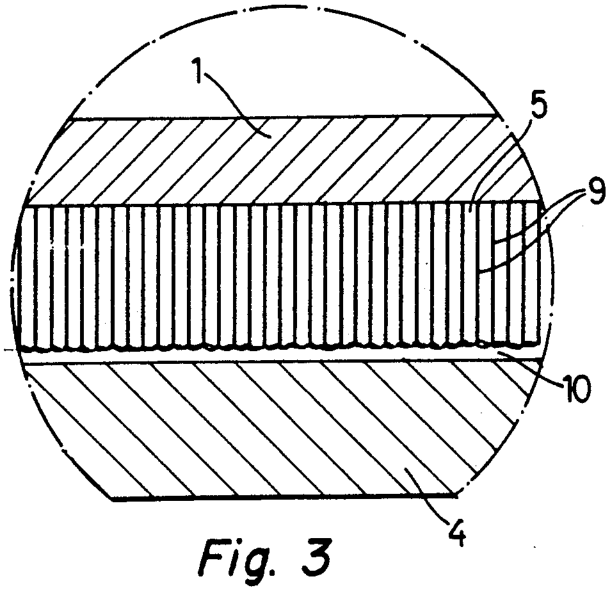
Figure 6:
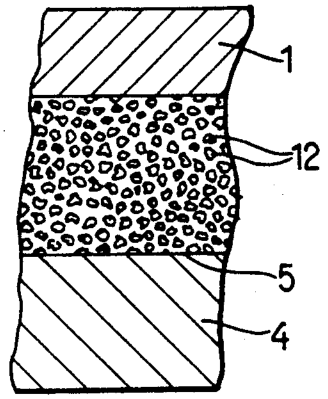
Figure 7:
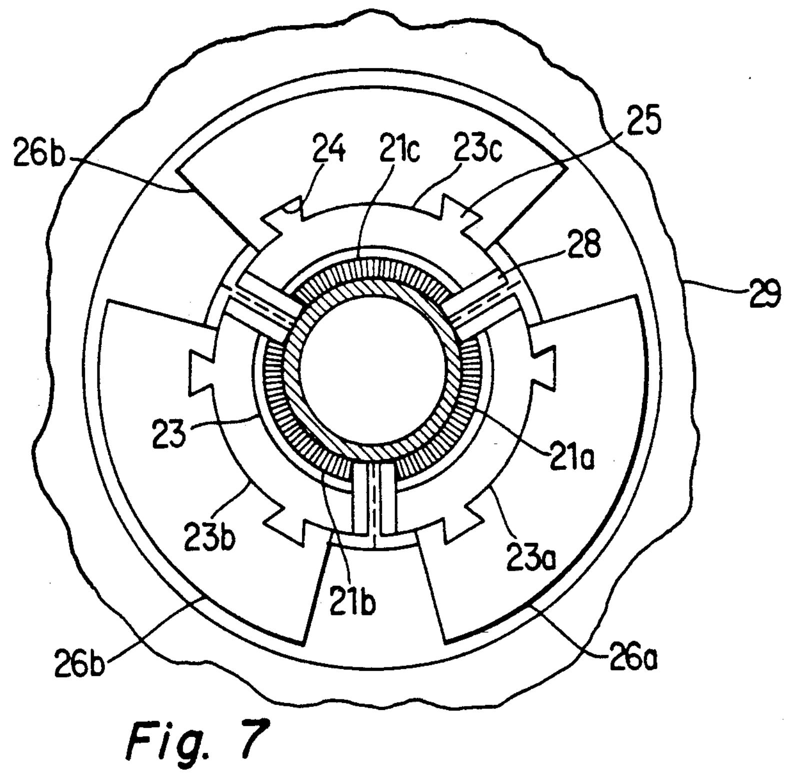
Figure 8:
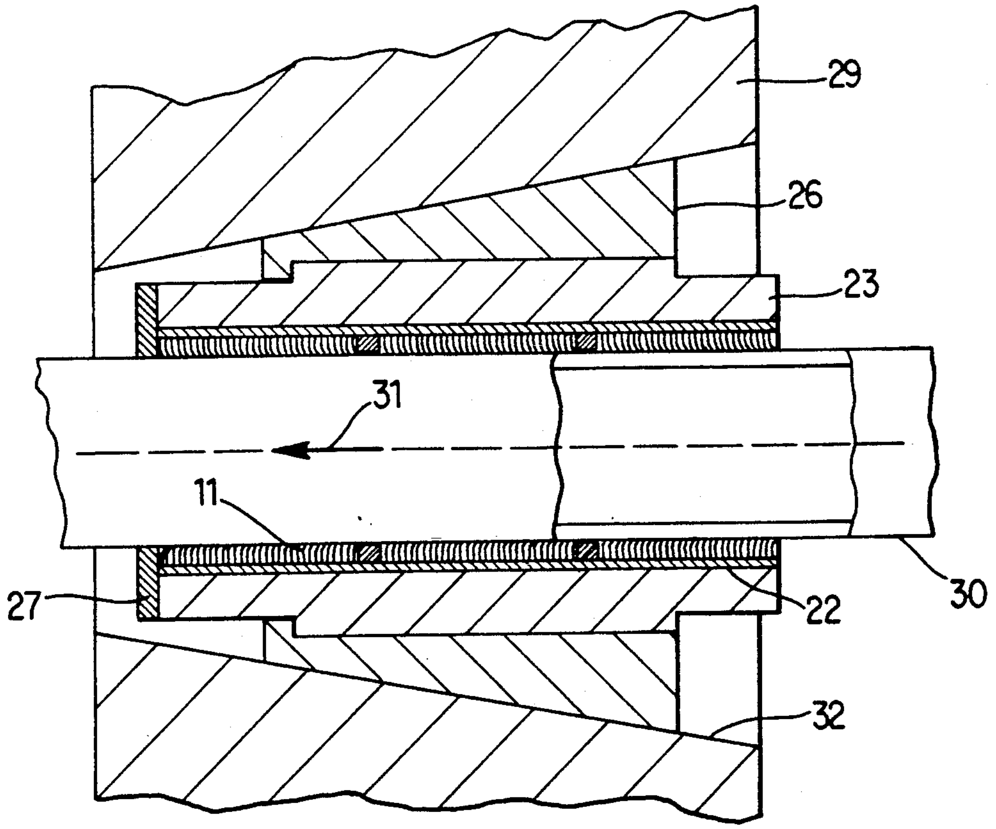
Figure 9:
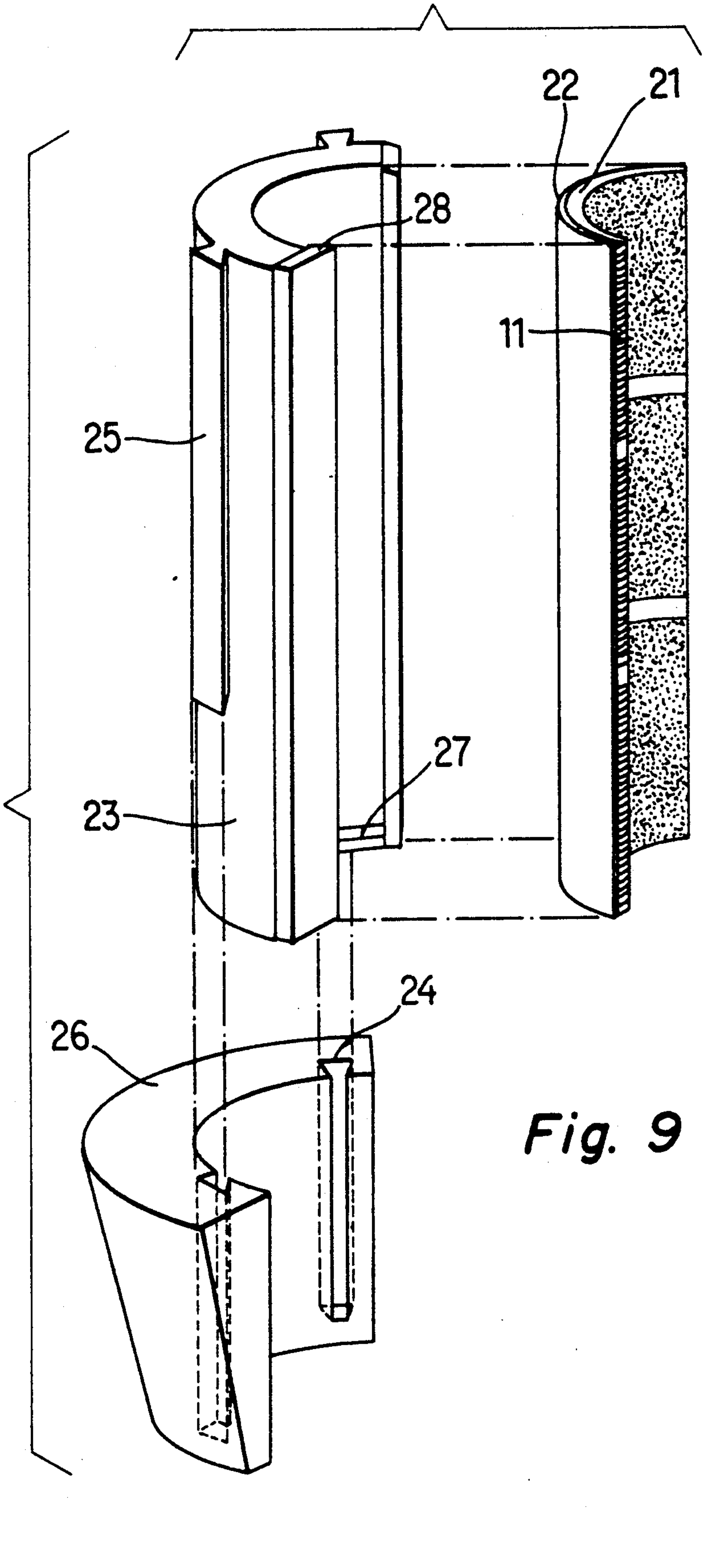

There is shown:

FIG. 1 the cross section through a pipe with clamping jaws embracing the same, FIG. 2 the longitudinal section A—B through the device of FIG. 1, FIG. 3 an enlarged illustration of a region of the longitudinal section A—B, FIG. 4 the enlarged plan view of a portion of the lining with embedded, pin-shaped elements, FIG. 5 the arrangement of pin-shaped elements having an inclination to the radial direction, FIG. 6 the enlarged illustration of a region of a longitudinal section of a lining with embedded granular particles, FIG. 7 the cross section through a wedge-bar anchor having linings with embedded pin-shaped elements, FIG. 8 a longitudinal section through the wedge-bar anchor of FIG. 7, and FIG. 9 perspective illustrations of individual components of the wedge-bar anchor.

In the exemplary embodiment of FIG. 1, a pipe section 1 is embraced by a clamping jaw 2 which consists of a clamping body 3 and a jaw shell 4 for the reception of a lining 5 of elastomeric material. The clamping body 3 has hinge-like attachment collars 3*a*, and the collars of non-illustrated, lever-like holding elements, which are secured by insertion of a bolt into the bores 6, project between the attachment collars 3*a*. The shell 4, together with the surface of the pipe 1, the end rings 7 at the faces and the longitudinal bars 8, forms a chamber for reception of the linings 5.

According to FIGS. 1 and 4, the lining 5 of elastomeric material contains radially oriented pins 9 whose radially outer ends terminate at a distance from the jaw shell 4. It is thus possible for the elastomeric material 10 in this region, when the parts to be screwed to one another have unevennesses, to shift sideways and compensate for the unevennesses. In the exemplary embodiment of FIG. 5, pins 11 having an inclination to the radial direction are embedded. In the radially outer region, their outline has a point of discontinuity 11*a* which is in the form of a kink and leads to a radially oriented region. Accordingly, the pins are better able to yield laterally to the extent required when the lining bears against surfaces which are not completely uniform. In a manner of speaking, the pins are thus designed to be resilient. Ferrous and non ferrous metals can be mentioned as suitable materials for the pins. Plastic pins of sufficient hardness are also conceivable. These can result in particularly gentle treatment of the surfaces to be gripped during the transfer of large torques. The pressure of the carrier material, which acts on all sides, prevents excessive yielding or bending of all rod-shaped elements.

In the exemplary embodiment of FIG. 6, the elastomeric material of the lining 5 contains granular particles 12, for example, diamond dust granules. Other crystalline materials such as quartz, glass, corundum, ceramic and the like are suitable.

The linings 5 together can span an angle of virtually 360 degrees so that only small, i.e., slit-shaped, spaces 13 exist which must be present to guarantee an adequate bearing force. In connection with the large angle of span, the pressure can be determined by the length of the linings so that linings whose pressure is appropriate for the particular pipe material can be prepared.

In the device of FIGS. 7 to 9, the lining which embraces the pipe 20 is divided into three segments 21*a* to 21*c*. Each segment is secured in a multipartite adapter 23*a* to 23*c* by configurational locking. The adapters 23*a* to 23*c* are connected to wedges 26*a* to 26*c* by configurational locking via dovetail-shaped grooves 24 and correspondingly designed tongues 25.

Chamber-shaped receiving compartments for the linings 21 and their rigid shells 22 are formed in the adapter elements 23 by end rings 27 and longitudinal bars 28. The linings are thus secured against rotation as well as against shifting in longitudinal direction.

In assembled condition, the outer peripheral surfaces of the wedges 26 lie in a wedge-shaped opening 32 of a housing ring of the overall wedge-bar anchor. Due to the weight of the conduit 30, which acts in the direction of the arrow 31, all of the elements constituting part of the wedge-bar anchor shift into one another after release of an elevator and hold the conduit at the upper end of the conduit without damage to the outer periphery of the conduit by cuts or notches resulting from blade-like tools.

I claim:

1. A clamp, comprising a plurality of members which are relatively movable towards and away from one another for gripping and releasing objects; an elastomeric layer on at least one of said members; and a plurality of gripping elements at least partially embedded in said layer, each of said element shaving a tip which is directed away from said at least one member, said elements comprising pins and at least one predetermined first portion of each of said pins being inclined to the radial direction of said at least one member, each of said pins further having a second portion which is inclined to the respective first portion, the first and second portions defining a bend in the respective pin.

2. The clamp of claim 1, wherein said elements have high hardness.

3. The clamp of claim 1, wherein said elements are rod-shaped.

4. The clamp of claim 1, wherein said elements have small cross-sectional areas.

5. The clamp of claim 1, wherein said layer has a surface which faces away from said at least one member, each of said elements extending to the surface.

6. The clamp of claim 1, wherein said layer has a first surface which faces away from said at least one member and a second surface in contact with said at least one member, each of said elements extending to said first surface and having an end portion which confronts and is spaced from said second surface.

7. The clamp of claim 1, wherein said elements comprise particles and each of said particles includes a material selected from the group consisting of diamond, glass, ceramic, corundum and quartz.

8. The clamp of claim 7, wherein said particles have approximately the same size.

9. The clamp of claim 7, wherein said particles have different sizes.

10. The clamp of claim 1, wherein said layer is adhesively secured to said at least one member.

11. The clamp of claim 1, wherein said layer and said at least one member have complementary coupling portions.

12. The clamp of claim 1, wherein said at least one member has a recess and said layer is disposed in said recess.

13. The clamp of claim 1, wherein said at least one member and said layer define a concavity for the receipt of a pipe section.

14. The clamp of claim 1, wherein said at least one member and said layer circumscribe an angle of approximately 180 degrees.

15. The clamp of claim 1, wherein said at least one member comprises a wedge-like section, and an adapting section connected to said wedge-like section, said layer being disposed on said adapting section.

16. The clamp of claim 15, wherein another of said members comprises a wedge-like section, and an adapting section connected to such wedge-like section, said adapting section constituting part of a multipartite adapter; and further comprising an additional elastomeric layer on the adapting section of said other member, and additional gripping elements at least partially embedded in said additional layer, each of said additional elements having a tip which is directed away from said other member.

17. The clamp of claim 15, wherein said wedge-like section and said adapting section have complementary coupling portions.

18. The clamp of claim 15, wherein said members comprise said at least one member and two additional members, each of said additional members including a wedge-like section, and an adapting section connected to the respective wedge-like section, said adapting sections constituting part of a multipartite adapter; and further comprising an additional elastomeric layer on the adapting section of each of said additional members, and additional gripping elements at least partially embedded in each of said additional layers, each of said additional elements having a tip which is directed away from the respective member, and each adapting section, together with the respective layer, circumscribing an angle of about 120 degrees.

* * * * *